United States Patent
Nakamura

[11] Patent Number: 5,993,588
[45] Date of Patent: Nov. 30, 1999

[54] THERMO AND ACTIVE ENERGY RAY CURABLE RESIN COMPOSITION USED FOR PROTECTING LAYER OF TRANSFER MATERIAL TRANSFER MATERIAL SURFACE PROTECTING MATERIAL AND PROCESS FOR PRODUCING MOLDED ARTICLE EXCELLENT IN ABRASION RESISTANCE AND CHEMICAL RESISTANCE

[75] Inventor: Yuzo Nakamura, Kyoto, Japan

[73] Assignee: Nissha Printing Co., Ltd., Kyoto, Japan

[21] Appl. No.: 08/983,007

[22] PCT Filed: Apr. 28, 1997

[86] PCT No.: PCT/JP97/01476

§ 371 Date: Dec. 23, 1997

§ 102(e) Date: Dec. 23, 1997

[87] PCT Pub. No.: WO97/40990

PCT Pub. Date: Nov. 6, 1997

[30] Foreign Application Priority Data

Apr. 26, 1996 [JP] Japan ................. 8-130726
Apr. 26, 1996 [JP] Japan ................. 8-130727

[51] Int. Cl.$^6$ ............... B32B 7/06; B32B 7/12; B32B 31/28; B32B 23/08
[52] U.S. Cl. ............ 156/212; 156/230; 156/245; 156/273.7; 156/275.5; 156/275.7; 428/41.5; 428/41.7; 428/41.8; 428/424.2; 428/515; 427/146; 264/259; 522/90; 522/100; 522/120
[58] Field of Search ................ 156/212, 230, 156/245, 273.7, 275.5, 275.7; 428/41.3, 41.5, 41.7, 41.8, 195, 423.1, 424.2, 500, 515; 264/264, 266; 427/496, 508, 146, 147, 148; 522/90, 93, 96, 100, 101, 120

[56] References Cited

U.S. PATENT DOCUMENTS

| 4,017,649 | 4/1977 | DeMajistre | 427/496 |
| 4,369,157 | 1/1983 | Conner | 264/266 |
| 4,598,009 | 7/1986 | Christie et al. | 428/172 |
| 4,617,349 | 10/1986 | Nasu et al. | 525/123 |
| 4,786,657 | 11/1988 | Hammar et al. | 522/90 |
| 5,174,848 | 12/1992 | Yazaki et al. | 156/275.5 |
| 5,674,623 | 10/1997 | Haddon et al. | 522/101 |

*Primary Examiner*—Michael W. Ball
*Assistant Examiner*—Michael A Tolin
*Attorney, Agent, or Firm*—Wenderoth, Lind & Ponack, L.L.P.

[57] ABSTRACT

The sheet material of the present invention has a protecting layer which comprises a heat reactant of a heat and active energy ray curable resin composition comprising as an active ingredient a polyfunctional isocyanate and a polymer having a (meth)acryl equivalent weight from 100 to 300 g/eq, a hydroxyl value from 20 to 500 and a weight-average molecular weight from 5000 to 50000. And, this protecting layer applied to the surface of a molded article is cured by active energy ray irradiation. Therefore, a molded article excellent in abrasion resistance and chemical resistance can be obtained, and cracking is not caused in the curved part of the molded article. Further, since the protecting layer is cured in part by heat in sheet material production, a large scale active energy ray irradiation apparatus is not required in active energy ray irradiation to realize low cost.

24 Claims, 3 Drawing Sheets

5,993,588

THERMO AND ACTIVE ENERGY RAY CURABLE RESIN COMPOSITION USED FOR PROTECTING LAYER OF TRANSFER MATERIAL TRANSFER MATERIAL SURFACE PROTECTING MATERIAL AND PROCESS FOR PRODUCING MOLDED ARTICLE EXCELLENT IN ABRASION RESISTANCE AND CHEMICAL RESISTANCE

TECHNICAL FIELD

The present invention relates to a heat and active energy ray curable resin composition used for the protecting layer of a transfer material, which can provide at a low cost a molded article excellent in abrasion resistance and chemical resistance, and which does not cause crack in the curved part of the molded article, a transfer material, a surface protecting material, and a process for producing a molded article excellent in abrasion resistance and chemical resistance.

PRIOR ART

As a method for producing a molded article excellent in abrasion resistance and chemical resistance, there are a method in which the protecting layer of a transfer material produced by forming a protecting layer on a substrate sheet having releasing property, is adhered on the surface of a molded article, and the substrate sheet is released, a method in which the substrate sheet of a surface protecting material produced by forming a protecting layer on a substrate sheet having no releasing property, is adhered on the surface of a molded article, and the like.

As a protecting layer used for a sheet material such as the above-described transfer material and surface protecting material, a heat curable resin and an active energy ray curable resin are generally used.

However, when a heat curable resin is used as a protecting layer, the surface of a molded article is inferior in chemical resistance and abrasion resistance in general.

On the other hand, when an active energy ray curable resin is used as a protecting layer, the crosslinking density of a resin which forms the protecting layer increases, and chemical resistance and abrasion resistance are improved. However, the resultant protecting layer becomes fragile. As a result, cracking occurs on the protecting layer at the part which curves along a molded article in adhering.

Therefore, there has been suggested a method in which, an active energy ray curable resin formed as a protecting layer, is irradiated with an active energy ray first for semi-curing the resin to form a sheet material. The protecting layer is applied on the surface of a molded article, and the active energy ray curable resin is again irradiated with an active energy ray for completely curing.

However, in this method, if the irradiation amount of the active energy ray is deficient in the first irradiation step, flowability and stickiness remain on the surface of the protecting layer of the sheet material. As a result, handling of the sheet material becomes inconvenient.

On the other hand, when the irradiation amount is excess, cracking is liable to occur in the protecting layer at the curved part of the molded article in adhering.

To prevent such a problem, it is necessary to control the irradiation amount in the first irradiation step. However, a radical polymerization proceeds quickly and a dark reaction progresses even after irradiation of an active energy ray, therefore, it is not easy to control the irradiation amount.

There is also a problem that the irradiation condition is liable to be unstable due to degradation of the light source of the active energy ray.

Further, the sheet material has wide and large surface area, and a large scale and costly irradiation apparatus is required for irradiating it.

The object of the present invention is to provide a resin composition used for the protecting layer of a sheet material which solves the above-mentioned problems, which can give a molded article excellent in abrasion resistance and chemical resistance at a low cost, and which does not cause cracking at the curved part of the molded article in adhering the sheet material.

SUMMARY OF THE INVENTION

The present inventors have intensively studied to solve the above-mentioned problems. As a result, we have found that the above-mentioned problems can be solved, on condition that a heat and active energy ray curable composition comprising a specific polymer and polyfunctional isocyanate is used as an active ingredient, in producing the protecting layer of a sheet material, such as a transfer material and a surface protecting material.

That is, the heat and active energy ray curable resin composition used for the protecting layer of the sheet material of the present invention, comprises as an active ingredient a polyfunctional isocyanate and a polymer having a (meth)acrylic equivalent weight from 100 to 300 g/eq, a hydroxyl value from 20 to 500 and a weight-average molecular weight from 5000 to 50000.

DETAILED DESCRIPTION OF THE INVENTION

Figure 1:
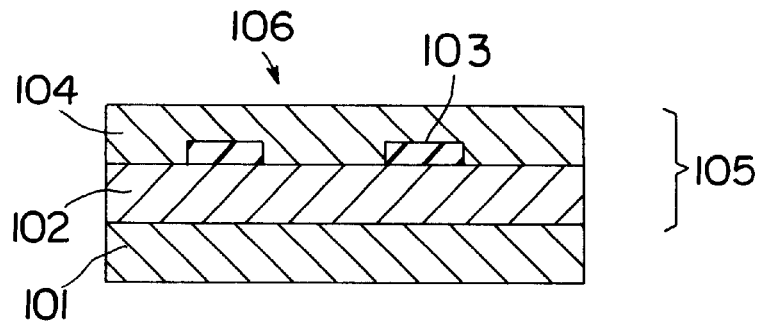
FIG. 1 is a schematic sectional view which shows one example of the transfer material according to the present invention.

First, the transfer material 106 of the present invention will be described by reference to FIG. 1.

As the substrate sheet 101 having releasing property, there can be used any material which is usually used as a substrate sheet of a transfer material, such as a sheet of a polypropylene-based resin, polyethylene-based resin, polyamide-based resin, polyester-based resin, polyacryl-based resin, polyvinyl chloride-based resin or the like, a metal foil such as an aluminium foil, copper foil or the like, a cellulose-based sheet such as a glassine paper, coat paper, cellophane or the like, a complex of the above-mentioned sheets, or the like.

If the releasing property of a transfer layer 105 from the substrate sheet 101 is excellent, the transfer layer 105 may be applied directly on the substrate sheet 101. If the releasing property of the transfer layer 105 from the substrate sheet 101 is poor, a releasing layer (not indicated) may be formed on the whole surface before the transfer layer 105 is applied on the substrate sheet 101.

In general, when the substrate sheet 101 is released after the transfer, the releasing layer is released from the transfer layer 105 together with the substrate sheet 101. As a raw material of the releasing layer, a melamine resin-based releasing agent, silicone resin-based releasing agent, fluorine resin-based releasing agent, cellulose derivative-based releasing agent, urea rein-based releasing agent, polyolefin resin-based releasing agent, paraffin-based releasing agent and complex-based releasing agent composed of them can be used. As a forming method of the releasing layer, there are coating methods such as a gravure coating method, roll coating method, spray coating method, lip coating method, comma coating method and the like, and printing methods such as a gravure printing method, screen printing method and the like.

The protecting layer 102 is a layer which becomes a most outer layer of the transferred material by being released from the substrate sheet 101 or the releasing layer when the substrate sheet 101 is released after transfer, and protects the molded article and the picture layer 103 from chemicals and abrasion. To form this protecting layer 102, there is used a heat and active energy ray curable resin composition comprising as an active ingredient a polyfunctional isocyanate and a polymer having a (meth)acrylic equivalent weight from 100 to 300 g/eq, a hydroxyl value from 20 to 500 and a weight-average molecular weight from 5000 to 50000.

The polymer used for the protecting layer 102 has a (meth)acrylic equivalent weight from 100 to 300 g/eq, preferably from 150 to 300 g/eq, in view of curing property in an active energy ray irradiation. When the (meth)acrylic equivalent weight is more than 300 g/eq, abrasion resistance after active energy ray irradiation is insufficient, and the polymer having a (meth)acrylic equivalent weight of less than 100 g/eq is difficult to be obtained. And, the hydroxyl value of the polymer is from 20 to 500, preferably from 100 to 300, in view of reactivity with the polyfunctional isocyanate used together. When the hydroxyl value is less than 20, reactivity with the polyfunctional isocyanate becomes insufficient, and the heat crosslinking degree of the protecting layer 102 of the transfer material 106 becomes low. Therefore, stickiness remains or solvent resistance is deficient, and consequently, rolling and overprinting of the transfer material 106 become difficult. Further, the polymer having a hydroxyl value of over 500 is difficult to be obtained.

The weight-average molecular weight of the polymer is from 5000 to 50000, preferably from 8000 to 40000. When the weight-average molecular weight of the polymer is less than 5000, solvent resistance becomes poor or stickiness remains on the protecting layer 102 of the transfer material 106, and consequently, rolling and overprinting of the transfer material 106 become difficult and a clear picture is not obtained. Further, when over 50000, viscosity of the resin becomes too high, and applying workability of the ink decreases.

The production method of the polymer is not particularly restricted, and conventionally known methods can be employed. For example, there are a method [1] in which a (meth)acryloyl group is introduced into a part of side chains of a polymer having a hydroxyl group, a method [2] in which an $\alpha,\beta$-unsaturated monomer having a hydroxyl group is subjected to a condensation reaction with a copolymer having a carboxylic group, a method [3] in which an $\alpha,\beta$-unsaturated monomer having an epoxy group is subjected to an addition reaction with a copolymer having a carboxylic group, and a method [4] in which an $\alpha,\beta$-unsaturated carboxylic acid is reacted with a polymer having an epoxy group.

The production method of the polymer used in the present invention will be specifically described using as an example the method [4]. For example, the polymer used in the present invention can be obtained by a method in which a polymer having a glycidyl group is reacted with an $\alpha,\beta$-unsaturated carboxylic acid such as acrylic acid or the like.

The preferable polymer having a glycidyl group is glycidyl (meth)acrylate-based polymer. As the glycidyl (meth)acrylate-based polymer, for example, a homopolymer of glycidyl (meth)acrylate and a copolymer of glycidyl (meth)acrylate and an $\alpha,\beta$-unsaturated monomer having no carboxyl group are exemplified.

As this $\alpha,\beta$-unsaturated monomer having no carboxyl group, various (meth)acrylates, styrene, vinyl acetate, acrylonitrile and the like can be exemplified. If an $\alpha,\beta$-unsaturated monomer having a carboxyl group is used, crosslinkage is formed in the copolymerization reaction with glycidyl (meth)acrylate, and increasing in viscosity and gelling are unpreferably caused.

When the polymer used for the protecting layer 102 is produced, it is necessary to appropriately set conditions such as the kind of the monomer used, the kind of the polymer and the amounts used thereof, so as to suffice the above-described numerical value restriction ranges regarding to the polymer. Such procedure is known to those skilled in the art.

As the polyfunctional isocyanate used together with the polymer in the present invention, known various isocyanates can be used. For example, isophorone diisocyanate, xylylene diisocyanate, hydrogenated xylylene diisocyanate, tolylene diisocyanate, diphenylmethane diisocyanate, 1,6-hexane diisocyanate, a trimer of the above-mentioned isocyanates, a prepolymer obtained by the reaction of polyfunctional alcohol and the above-mentioned diisocyanate and the like can be used.

The reason why the polyfunctional isocyanate is used together with the polymer in the present invention is that the isocyanate keeps stickiness of the protecting layer 102 before active energy ray irradiation low, and it provides resistance to the solvent which is contained in the ink of the picture layer 103 and the adhesion layer 104, in laminating the picture layer 103 and the adhesion layer 104 on the protecting layer 102. That is, a hydroxyl group contained in the polymer is reacted with an isocyanate group of the polyfunctional isocyanate to form a slightly heat-crosslinked compound, which has the above-described characteristics.

The ratio used of the polymer to the polyfunctional isocyanate is determined so that the ratio of the number of a hydroxyl group to the number of an isocyanate group in the polymer is from 1/0.01 to 1/1, preferably from 1/0.05 to 1/0.8.

The heat and active energy ray curable resin composition used for the protecting layer 102 may optionally contain the following components in addition to the polymer and the polyfunctional isocyanate. That is, a reactive diluting monomer, solvent, coloring agent and the like. When an electron beam is used in active energy ray irradiation, sufficient effect can be obtained without using a photopolymerization initiator. On the other hand, when ultraviolet ray is used, it is necessary to add known various photopolymerization initiators. The protecting layer 102 may be either one which has been colored or one without coloring.

It is preferable for the resin composition used for the protecting layer 102 to contain a UV absorber. The object thereof is to impart weather resistance to the protecting layer which has been transferred to a molded article.

As the UV absorber, conventional compounds may be used. For example, salicylic acid-based, benzophenone-based, diphenyl acrylate-based, benzotriazole-based, triazine-based, and amine-based UV absorbers can be used.

The preferable UV absorber is one which comprises an aliphatic group having from 3 to 30, preferably from 10 to 20 carbon atoms containing a 2-hydroxypropylene dioxy moiety represented by the formula:

The reason for this is that such a UV absorber is excellent in compatibility with the resin composition which forms the protecting layer 102, and can be contained in a large amount with maintaining transparency of the protecting layer.

Specifically, hydroxyphenylbenzotriazol represented by the formula:

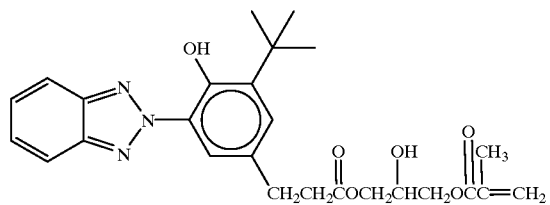

and hydroxyphenyl-S-triazine represented by the formula

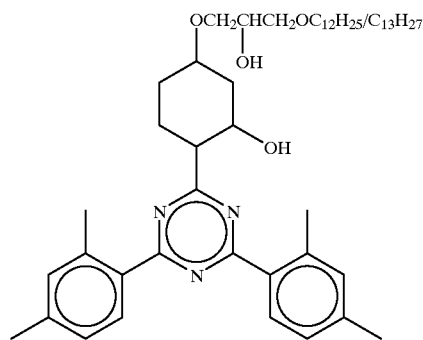

can be used.

The UV absorbers represented by the formulae are contained in an amount from 5 to 30% by weight, preferably from 8 to 20% by weight. When the amount of the UV absorber is lower than 5% by weight, weather resistance of the protecting layer becomes insufficient, and when over 30% by weight, (1) transparency of the protecting layer becomes poor, (2) flowability and coatability become poor, and (3) surface strength of the coated protecting layer becomes poor.

It is preferable for the resin composition used for the protecting layer 102 to contain a photostabilizer together with the UV absorber. The reason for this is that weather resistance of the protecting layer after transferring to a molded article is further improved. As the photostabilizer, conventional compounds may be used. The example thereof can include benzophenone-based, diphenyl acrylate-based, amine-based photostabilizers and the like.

The photostabilizer is contained in an amount from 0.2 to 5% by weight, preferably from 0.5 to 2.0% by weight. When the photostabilizer is lower than 0.2% by weight, weather resistance of the protecting layer becomes poor, and when over 5% by weight, (1) transparency of the protecting layer becomes poor, (2) flowability and coatability become poor, and (3) surface strength of the coated protecting layer becomes poor.

The preferable photostabilizer is a hindered amine-based compound. Specifically, "Tinuvin 123", "Tinuvin 144" and "Tinuvin 292" available from Ciba Geigy Ltd. can be used.

The resin composition used for the protecting layer 102 may optionally contain a lubricant. The reason for this is that the surface of the protecting layer is made rough, therefore, the protecting layer becomes easy to be rolled as a sheet, the sheet becomes difficult to be blocked, and the sheet has resistance against rubbing or scratching. As the lubricant, for example, waxes such as polyethylene wax, paraffine wax, synthesized wax, montan wax, and silicone-based, or fluorine-based synthetic resin can be used.

The lubricant is contained in an amount from 0.5 to 15% by weight, preferably from 1 to 6% by weight. When the amount of the lubricant is lower than 0.5% by weight, rubbing, scratching resistance, on blocking resistance of the sheet becomes poor, and when over 5% by weight, transparency of the protecting layer becomes poor.

The resin composition used for the protecting layer 102 contains an ethylenically unsaturated group, hydroxyl group and isocyanate group. When this resin composition is heated, the hydroxyl group and isocyanate group react to crosslink the resin. Further, when this resin composition is exposed to an active energy ray, the ethylenically unsaturated group is polymerized to crosslink the resin. That is, the resin composition used for the protecting layer 102 is a heat and active energy ray curable resin composition which is crosslinked by both heat and an active energy ray.

As methods for forming the protecting layer 102, there are coating methods such as a gravure coating method, roll coating method, comma coating method, lip coating method and the like, and printing methods such as a gravure printing method, screen printing method and the like. In general, the protecting layer 102 is formed in a thickness from 0.5 to 30 μm, more preferably from 1 to 6 μm. When the thickness of the protecting layer is lower than 0.5 μm, abrasion resistance or chemical resistance becomes poor, and when over 30 μm, cost of the sheet material becomes high, and cutability of the protecting layer becomes poor, and when it is used as a transfer material, a flash may occur.

Then, this protecting layer 102 is heated for crosslinking to make a tack free surface. However, in this stage, an ethylenically unsaturated group contained in the resin composition is not substantially crosslinked, and the resin is not completely cured. Therefore, the protecting layer 102 can be applied to the curved surface of a molded article and has such a flexibility which does not cause cracking.

A crosslinking reaction by heating is easier to be controlled by comparison with a crosslinking reaction by an active energy ray irradiation. Therefore, degree of crosslinking of the protecting layer 102 can appropriately be determined according to the kind of a resin composition used, curvature of a molded article and the like.

The picture layer 103 is formed on the protecting layer 102 usually by a printing method. Regarding to the raw material of the picture layer 103, resins such as a polyvinyl-based resin, polyamide-based resin, polyester-based resin, polyacryl-based resin, polyurethane-based resin, polyvinyl acetal-based resin, polyesterurethane-based resin, cellulose ester-based resin, alkyd resin and the like may be used as a binder, and coloring ink containing a dye or pigment having suitable color as a coloring agent may be used. As methods for forming the picture layer 103, usual printing methods such as an offset printing method, gravure printing method, screen printing method and the like may be used.

Particularly, an offset printing method and gravure printing method are suitable for conducting multi-color printing and gradation expression. Further, in the case of mono-color printing, coating methods such as a gravure coating method, roll coating method, comma coating method and the like can also be employed. The picture layer 103 is formed on a part of the surface or the whole surface according to a picture to be expressed. Further, the picture layer 103 may be composed of a metal film layer or composed of a combination of a printing layer and a metal film layer.

The adhesion layer 104 is one which adhere the above-mentioned respective layers on the surface of a molded article (not indicated). The adhesion layer 104 is formed on the part to be adhered to the molded article of the protecting layer 102 or of the picture layer 103. That is, when whole surface is to be adhered, the adhesion layer 104 is formed on the whole surface. And, when a part of the surface is to be adhered, the adhesion layer 104 is formed partially. As the adhesion layer 104, a heat sensible or pressure sensible resin suitable for the raw material of the molded article is appropriately used. However, if the protecting layer 102 or the picture layer 103 has sufficient adhesiveness to the molded article, the adhesion layer 104 may be omitted.

For example, when the raw material of the molded article is a polyacryl-based resin, a polyacryl-base resin may be used. Further, when the raw material of the molded article is a polyphenylene oxide-polystyrene-based resin, polycarbonate-based resin, styrene copolymer-based resin or polystyrene-based blend resin, a polyacryl-based resin, polystyrene-based resin, polyamide-based resin and the like which has affinity with the resins may be used. Further, the raw material of the molded article is a polypropylene resin, a chlorinated polyolefin resin, chlorinated ethylene-vinyl acetate copolymer resin, cyclized rubber and cumarone-indene resin can be used.

As a method for forming the adhesion layer 104, there are coating methods such as a gravure coating method, roll coating method, comma coating method and the like, and printing methods such as a gravure printing method, screen printing method and the like.

Figure 2:
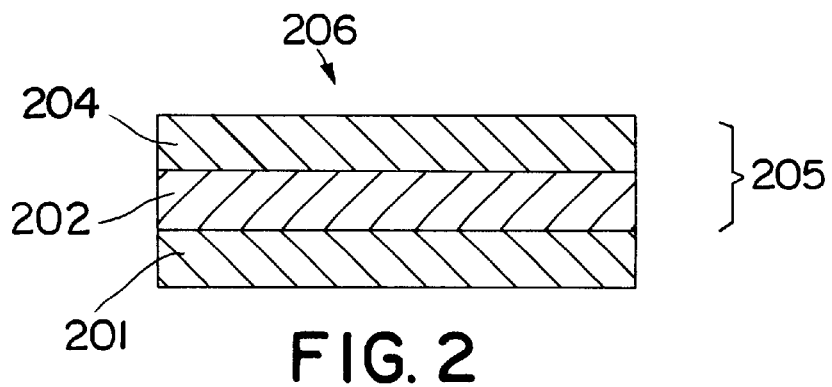
FIG. 2 is a schematic sectional view which shows another example of the transfer material according to the present invention.

In the present invention, construction of the transfer layer is not restricted to the above-mentioned embodiments. For example, when only surface protection is intended for utilizing the background pattern and transparency of the molded article, the protecting layer 202 and adhesion layer 204 can be formed in order on the substrate sheet 201 as described above, and the picture layer can be omitted as shown in FIG. 2.

Further, an anchor layer may be formed between the protecting layer and the adhesion layer which constitute the transfer layer. The anchor layer is a resin layer which enhances adhesiveness between the protecting layer and the adhesion layer and protects the molded article and the picture layer from chemicals. For example, thermoplastic resins such as a two-pack setting urethane resin, melamine-based or epoxy-based thermosetting resin, vinyl chloride copolymer resin and the like can be used. As a method for forming the anchor layer, there are coating methods such as a gravure coating method, roll coating method, comma coating method and the like and printing methods such as a gravure printing method, screen printing method and the like.

A method for producing a molded article excellent in abrasion resistance and chemical resistance using the transfer material of the present invention will be described bellow.

Figure 3:
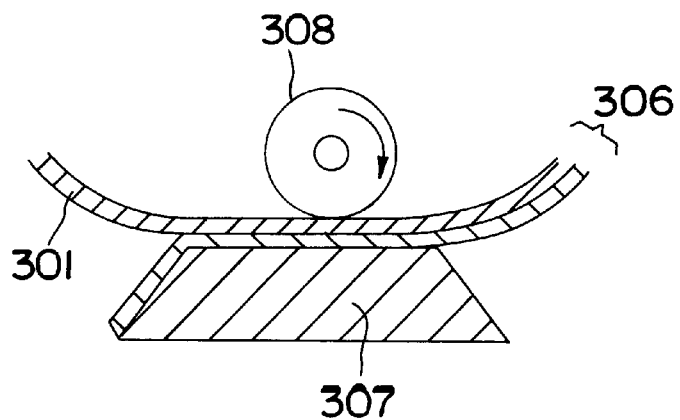
FIG. 3 is a schematic view which shows one example of a production process for a molded article excellent in abrasion resistance and chemical resistance using the transfer material according to the present invention.

First, as shown in FIG. 3, the transfer material 306 is placed on the molded article 307 with the adhesion layer thereof facing to the molded article (below).

Then, by using a transferring machine such as a roll transferring machine equipped with the heat resistant rubber-like elastomer 308, for example a silicon rubber, up-down transferring machine, and the like, heat and/or pressure is applied to the transfer material 306 from the side of the substrate sheet 301 through the heat resistant rubber-like elastomer 308 set at the conditions of a temperature from 80 to 260° C. and a pressure from 50 to 200 kg/m$^2$. According to the procedure, the protecting layer is adhered to the surface of the molded article 307 via the adhesion layer. Then, the substrate sheet 301 is pulled after cooling, peeling occurs in the boundary surface between the substrate sheet 301 and the protecting layer.

If a releasing layer is formed on the substrate sheet 301, when the substrate sheet 301 is pulled, peeling occurs in the boundary surface between the releasing layer and the protecting layer. Finally, an active energy ray is irradiated to the protecting layer transferred to the molded article 307 to cure. The step of irradiating the active energy ray may be conducted before the step of peeling the substrate sheet 301.

As the active energy ray, an electron beam, ultraviolet ray, γ-ray and the like can be used. The irradiation condition may be determined according to the kind of the heat and active energy ray curable resin composition.

Regarding the molded article 307, though the raw material thereof is not restricted, there can be exemplified in particular a resin molded article, wooden article or complex article thereof. These may be transparent, translucent or opaque. The molded article 307 may be colored or not colored. The example of the resin includes general-purpose resins such as a polystyrene-based resin, polyolefin-based resin, ABS resin, AS resin, AN resin and the like.

Further, there can be used general-purpose engineering resins such as a polyphenylene oxide-polystyrene-based resin, polycarbonate-based resin, polyacetal-based resin, acryl-based resin, polycarbonate modified polyphenylene ether resin, polyetylene terephthalate resin, polybutylene terephthalate resin, ultra high molecular weight polyethylene resin and the like, and super engineering resins such as a polysulfone resin, polyphenylene sulfide-based resin, polyphenylene oxide-based resin, polyacrylate resin, polyether imide resin, polyimide resin, liquid crystal polyester resin, polyallyl-based heat resistant resin and the like. Further, a complex resin obtained by adding a reinforcing material such as a glass fiber, inorganic filler or the like can also be used.

A molded article excellent in abrasion resistance and chemical resistance can also be produced, by utilizing a simultaneous molding and transferring method in which transferring is conducted simultaneously with molding by injection molding, using the transfer material of the present invention.

Figure 4:
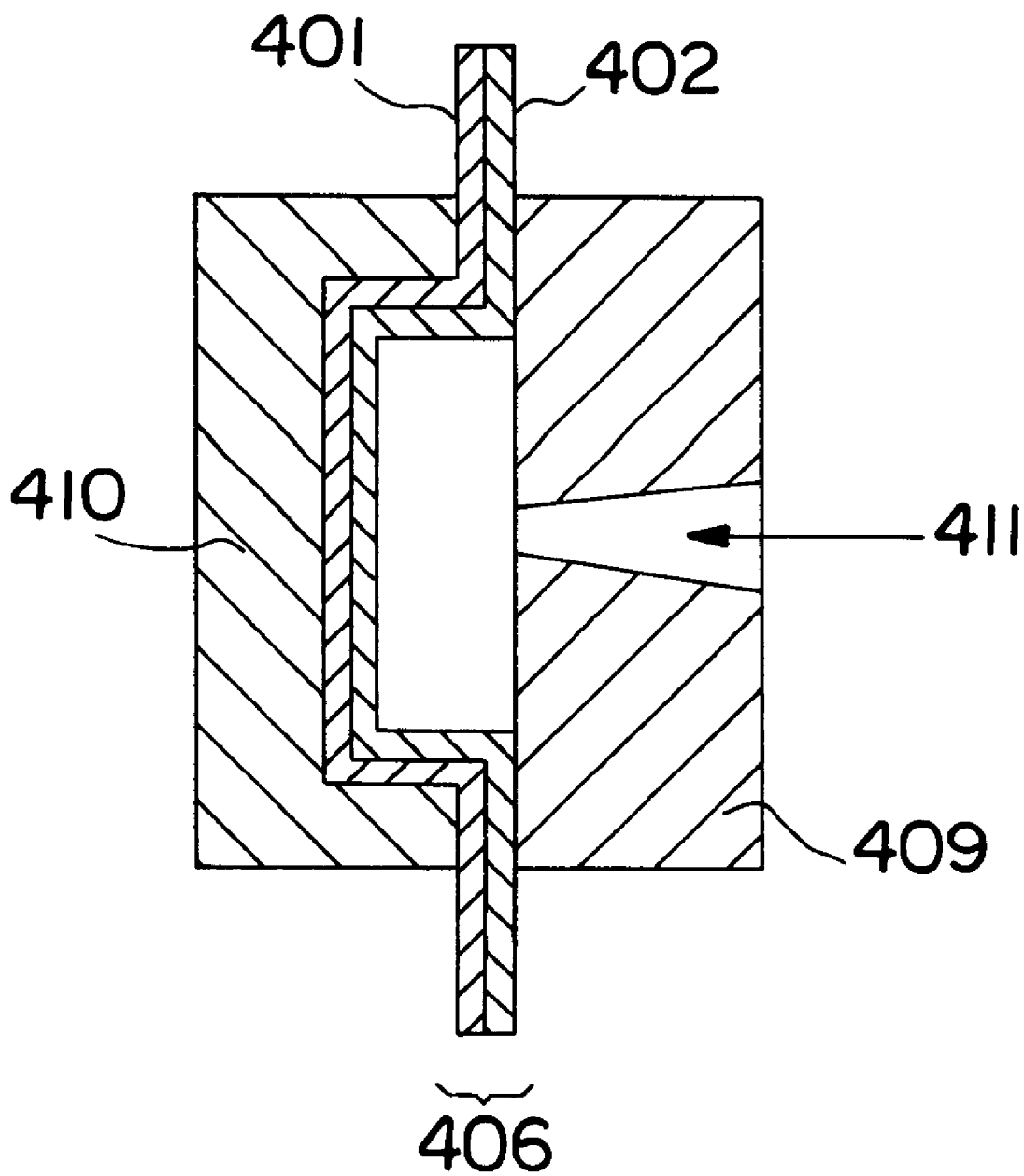
FIG. 4 is a schematic view which shows another example of a production process for a molded article excellent in abrasion resistance and chemical resistance using the transfer material according to the present invention.

First, as shown in FIG. 4, into a mold comprising the movable mold 409 and the fixed mold 410 is fed the transfer material 406 with the protecting layer 402 facing the inside, that is with the substrate sheet 401 contacting the fixed mold 410. In this process, separate transfer materials 406 may be fed in one by one, or necessary portions of a long transfer material 406 may be fed in intermittently.

When the long transfer material 406 is used, it is preferable to make the position of the picture layer of the transfer material 406 correspond to the mold by using a feeding apparatus having positioning mechanism. Further, if the position of the transfer material 406 is detected by a sensor when the transfer material 406 is fed in intermittently and thereafter the transfer material 406 is fixed by the movable mold 409 and the fixed mold 410, the transfer material 406 can be fixed constantly at the same position and deviation of the picture layer does not occur, therefore such process is convenient.

The mold is closed, through a gate formed in the movable mold 409 is injected the molten resin 411 into the mold for filling, a molded article is formed and simultaneously to its surface is adhered the protecting layer 402 of the transfer material 406 or the adhesion layer formed on the surface thereof.

Then, the resin molded article is cooled, the mold is opened and the resin molded article is taken out. Finally, the substrate sheet 401 is peeled, and the protecting layer 402 is cured by irradiation of an active energy ray. Otherwise, the substrate sheet 401 may be peeled after irradiation of an active energy ray.

As an another embodiment of the present invention, there is an another method in which a molded article excellent in abrasion resistance and chemical resistance is produced, using the above-mentioned resin composition. In this method, there is used a surface protecting material comprising a substrate sheet having no releasing property and a protecting layer formed on it. The surface protecting material is produced using the same procedure and material as the transfer material except that a material having no releasing property is used as a substrate sheet and the adhesion layer is not formed on the protecting layer.

As a substrate sheet having no releasing property, a sheet of an acryl-based resin, polycarbonate-based resin, vinyl chloride-based resin, urethane-based resin, polyester-based resin and the like can be used.

An adhesion layer may optionally be formed on the surface on which the protecting layer is not formed, of the substrate sheet. The adhesion layer is formed using the same procedure and material as the transfer material except that it is formed on the surface of the substrate sheet.

Figure 5:
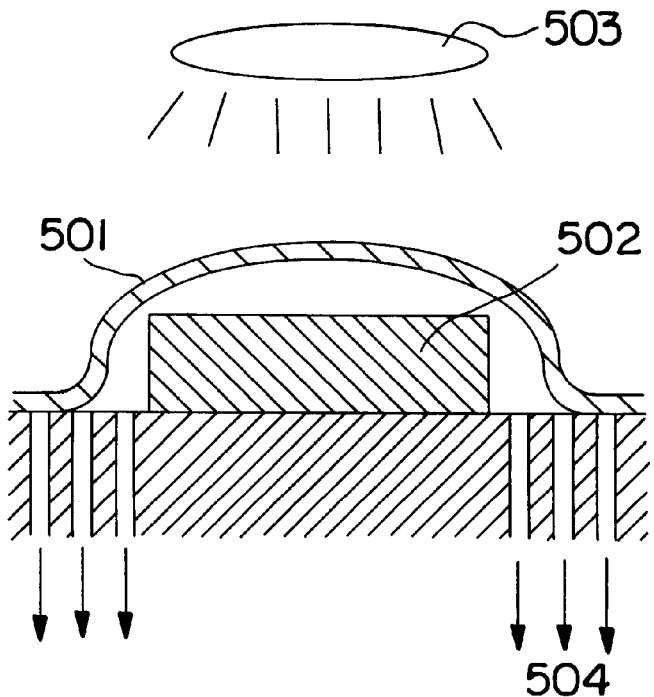
FIG. 5 is a schematic view which shows one example of a production process for a molded article excellent in abrasion resistance and chemical resistance according to the present invention.

First, the surface protecting material 501 is placed to cover the molded article 502 with the protecting layer thereof facing above as shown in FIG. 5. Then, by using a heater 503 and the like, the surface protecting material 501 is heated to soften, and vacuum suction 504 is conducted from the lower side. By this procedure, the substrate sheet or the adhesion layer formed on it is adhered to the surface of the molded article 502. Finally, the protecting layer is cured by irradiating an active energy ray.

Otherwise, pressure may be applied from the upper side of the surface protecting material 501 in addition to the vacuum suction 504 from the lower side. Pressure can be applied using a liquid or the like directly or further via a flexible sheet and the like.

As in the case of the transfer material, a molded article excellent in abrasion resistance and chemical resistance can also be produced, by utilizing a simultaneous method in which transferring is conducted simultaneously with molding by injection molding.

Figure 6:
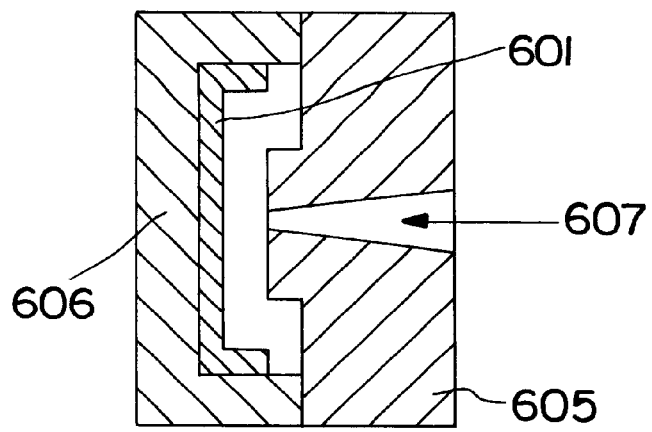
FIG. 6 is a schematic view which shows another example of a production process for a molded article excellent in abrasion resistance and chemical resistance according to the present invention.

First, as shown in FIG. 6, into a mold comprising the movable mold 605 and the fixed mold 606 is fed the surface protecting material 601 with the protecting layer facing outside, that is with the protecting layer contacting the fixed mold 606. In this process, the same procedure as in the production method using the transfer material may be used.

The mold is closed, through a gate formed in the movable mold 605 is injected the molten resin 607 into the mold for filling, a molded article is formed and simultaneously to its surface is adhered the substrate sheet of the surface protecting material 601 or the adhesion layer formed on the surface thereof. Then, the resin molded article is cooled, the mold is opened and the resin molded article is taken out. Finally, the protecting layer is cured by irradiating an active energy ray.

EXAMPLES

The present invention will be further specifically described by the following examples and comparative examples, however, the present invention is not restricted to them. In the examples, all "parts" and "%" are by weight.

Example 1

A polyester resin film having a thickness of 38 $\mu$m was used as a substrate sheet. A melamine resin-based releasing agent was applied on the substrate sheet in a thickness of 1 $\mu$m by using the gravure printing method to form a releasing layer, and a protecting layer composed of 200 parts (solid content: 100 parts) of varnish A described below and 5 parts of 1,6-hexane diisocyanate trimer (trade name: Coronate HX, manufactured by Nippon Polyurethane Industry K.K.), and 5 parts of a photopolymerization initiator (trade name: Irgacure 184, manufactured by Ciba-Geigy Co., Ltd.), was formed thereon by using the gravure printing method. The thickness of the protecting layer was 5 $\mu$m. The protecting layer was semi-cured by heating at 150° C. for 20 seconds, and a picture layer composed of an acryl-based ink and an adhesion layer composed of an acrylic resin were formed in order by printing according to the gravure printing method to obtain a transfer material.

The varnish A was obtained in the following method. First, into a reacting apparatus equipped with a stirring apparatus, cooling tube, dropping funnel and nitrogen introducing tube were charged 175 parts of glycidyl methacrylate (hereinafter, referred to as GMA), 75 parts of methyl methacrylate (hereinafter, referred to as MMA), 1.3 parts of lauryl mercaptan, 1000 parts of butyl acetate and 7.5 parts of 2,2'-azobisisobutyronitrile(hereinafter, referred to as AIBN), and they were heated until the temperature in the content rose to about 90° C. under nitrogen flow over 1 hour and kept at this temperature for 1 hour. Then, from a dropping funnel previously charged with a mixture composed of 525 parts of GMA, 225 parts of MMA, 3.7 parts of lauryl mercaptan and 22.5 parts of AIBN, the mixture was dropped into the reacting apparatus over about 2 hours under nitrogen flow. The resulting mixture was kept at the same temperature for 3 hours. To this was added 10 parts of AIBN and the mixture was kept at the temperature for 1 hour. Then, the mixture was heated up to 120° C., and kept at the temperature for 2 hours. After cooling to 60° C., the nitrogen introducing tube was changed to an air introducing rube, and 355 parts of acrylic acid (hereinafter, referred to as AA), 2.0 parts of methoquinone and 5.4 parts of triphenylphosphine were charged and mixed, then, the mixture was heated to 110° C. under air bubbling. The mixture was kept at the same temperature for 8 hours, then, 1.4 parts of methoquinone was charged. The mixture was cooled, and to this was added ethyl acetate until the nonvolatile content reached to 50% to obtain the varnish A. The polymer contained in the varnish A had an acryl equivalent weight of 270 g/eq, a hydroxyl value of 204 and a weight-average molecular weight (in terms of styrene by GPC) of 18000.

This transfer material was transferred to the surface of a molded article by utilizing the simultaneous transferring and molding method, then, the substrate sheet was peeled, and ultraviolet ray was irradiated to completely cure the protecting layer. The molding conditions included a resin temperature of 240° C., a mold temperature of 55° C., and a resin pressure of about 300 kg/cm$^2$. The raw material of the molded article was an acrylic resin, and it was molded into a tray-shaped article having a longitudinal length of 95 mm, a transverse length of 65 mm, a rising edge height of 4.5 mm and R at the corner part of 2.5 mm. Irradiation conditions included 120 W/cm, six lamps, a lamp height of 10 cm and a belt speed of 15 m/min.

Example 2

A polyester resin film having a thickness of 38 μm was used as a substrate sheet. A melamine resin-based releasing agent was applied on the substrate sheet in a thickness of 1 μm by using the gravure coating method to form a releasing layer, and a protecting layer composed of 200 parts (solid content: 100 parts) of the varnish A and 10 parts of 1,6-hexane diisocyanate trimer (trade name: Coronate HX, manufactured by Nippon Polyurethane Industry K.K.), and 5 parts of a photopolymerization initiator (trade name: Irgacure 184, manufactured by Ciba-Geigy Co., Ltd.), was formed thereon by using the lip coating-method. The thickness of the protecting layer was 5 μm. The protecting layer was semi-cured by heating at 150° C. for 20 seconds, and an anchor layer composed of an urethane-based ink, a picture layer composed of an acryl-based ink and an adhesion layer composed of an acrylic resin were formed in order by printing according to the gravure printing method to obtain a transfer material.

This transfer material was transferred to the surface of a molded article according to the same manner as in Example 1, by utilizing the simultaneous transferring and molding method, then, the substrate sheet was peeled, and ultraviolet ray was irradiated to completely cure the protecting layer. Irradiation conditions included 120 W/cm, two lamps, a lamp height of 10 cm and a belt speed of 2.5 m/min.

Example 3

A molded article was produced in the same manner as in Example 1 except that varnish B was used instead of the varnish A of Example 1. The varnish B was prepared by changing the amount used of the monomer (GMA) in the initial charging to 250 parts, the amount used of the monomer (GMA) in the later charging to 750 parts, and the amount used of AA to 507 parts. The polymer contained in the varnish B had an acryl equivalent weight of 214 g/eq, a hydroxyl value of 262 and a weight-average molecular weight of 20000.

Comparative Example A1

A protecting layer composed of a silicon-based resin (TPR 6701® manufactured by Toshiba silicone K.K.) was formed into a layer by the gravure printing method on the same polyester film as used in Example 1. Then, this resin composition was completely cured by heating. A molded article was produced in the same manner as in Example 1 except that the resulting transfer material was used and ultraviolet irradiation was not conducted after molding.

Comparative Example A2

A protecting layer composed of an urethane acrylate having a polymerizable double bond, a reactive diluting agent and a photopolymerization initiator was formed into a layer by the gravure printing method on the same polyester film as used in Example 1. Then, this resin composition was completely cured by irradiation with ultraviolet ray. A molded article was produced in the same manner as in Example 1 except that the resulting transfer material was used and ultraviolet irradiation was not conducted after molding. Irradiation conditions in preparing the transfer material included 120 W/cm, two lamps, a lamp height of 5 cm, and a belt speed of 20 m/min.

Comparative Example A3

A protecting layer composed of an urethane acrylate having a polymerizable double bond, a thermoplastic acrylic resin, and a photopolymerization initiator was formed into a layer by the gravure printing method on the same polyester film as used in Example 1. Then, this active energy ray curable resin composition was semi-cured by the first irradiation with ultraviolet ray.

A molded article was produced in the same manner as in Example 1 except that the resulting transfer material was used. Irradiation conditions in preparing the transfer material included 120 W/cm, one lamp, a lamp height of 10 cm, and a belt speed of 50 m/min.

Comparative Example B

A molded article was produced in the same manner as in Example 1 except that varnish C was used instead of the varnish A. The varnish C was prepared by changing the amounts used of the monomers in the initial charging to 125 parts of GMA and 125 parts of MMA respectively, the amounts used of the monomers in the later charging to 375 parts of GMA and 375 parts of MMA respectively, and the amount used of AA to 254 parts. The polymer contained in the varnish C had an acryl equivalent weight of 355 g/eq, a hydroxyl value of 158 and a weight-average molecular weight of 17000.

Performance Test

Crack occurrence, chemical resistance ability and abrasion resistance ability were evaluated with respect to the above-mentioned Examples 1 to 3, Comparative Examples A1 to A3, and Comparative Example B (Table 1). Crack occurrence was evaluated by observing the condition of the surface of the molded article according to the following evaluation standards judged by naked eyes: ○ no occurrence, Δ occurred a little, × occurred much.

Chemical resistance was evaluated by impregnating a gauze with methanol, observing the condition of the surface after 50 times reciprocating abrasion according to the following evaluation standards judged by naked eyes: ◎ no occurrence, ○ little occurrence, Δ occurred a few, × occurred much.

Abrasion resistance was evaluated by applying a load (100 g, 300 g) to a #000 steel wool of 1 cm square, observing the degree to be injured of the surface after 200 times reciprocating movements at the condition of 2 reciprocation/second and a moving distance of 2 cm according to the following evaluation standards judged by naked eyes: ○ good, Δ relatively bad, × bad.

TABLE 1

|  | Crack | Chemical resistance | Abrasion resistance 100 g | 300 g |
|---|---|---|---|---|
| Example 1 | ○ | ○ | ○ | Δ |
| Example 2 | ○ | ○ | ○ | Δ |
| Example 3 | ○ | ○ | ○ | ○ |
| Comparative Example A1 | Δ | Δ | Δ | x |
| Comparative Example A2 | x | ○ | ○ | ○ |
| Comparative Example A3 | ○ | Δ | Δ | x |
| Comparative Example B | ○ | ○ | x | x |

From the evaluation results of Table 1, the followings are evident. That is, the molded articles of Examples 1 to 3 having as the most outer layer a protecting layer composed of a heat reactant of the heat and active energy ray curable resin composition comprising as an active ingredient a polyfunctional isocyanate and a polymer having an acryl equivalent weight from 100 to 300 g/eq, a hydroxyl value from 20 to 500 and a weight-average molecular weight from 5000 to 50000 are excellent in abrasion resistance and chemical resistance, and have no cracks in the curved part of the molded article. However, the molded article of Comparative Example A1 has no sufficient result in any of crack occurrence, abrasion resistance and chemical resistance. The molded article of Comparative Example A2 has a lot of cracks while it is excellent in abrasion resistance and chemical resistance. The molded article of Comparative Example A3 is inferior in abrasion resistance and chemical resistance while it has no cracks. Further, the molded article of Comparative Example B having a protecting layer composed of a heat reactant of the conventional heat and active energy ray curable resin composition is also inferior in abrasion resistance, since the acryl equivalent weight of the polymer contained in the heat and active energy ray curable resin composition is over the specific range.

Example 4

An acrylic resin film having a thickness of 125 μm was used as a substrate sheet. A picture layer composed of an acryl-based ink and an adhesion layer composed of an acrylic resin were formed by printing on the one surface of the substrate sheet in order according to the gravure printing method. A protecting layer obtained by blending 200 parts (solid component: 100 parts) of the varnish A obtained in Example 1 and 5 parts of 1,6-hexane diisocyanate trimer (trade name: Coronate HX, manufactured by Nippon Polyurethane Industry K.K.), and 5 parts of a photopolymerization initiator (trade name: Irgacure 184, manufactured by Ciba-Geigy Co., Ltd.), were formed by printing on the opposite surface of the substrate sheet according to the gravure printing method. The thickness of the protecting layer was 5 μm. The protecting layer was semi-cured by heating at 80° C. for 30 seconds to obtain a surface protecting material.

This surface protecting material was adhered to the surface of a molded article by utilizing the insert molding method, then it was irradiated with ultraviolet ray. The molding conditions included a resin temperature of 220° C., a mold temperature of 55° C., and a resin pressure of about 300 kg/cm². The raw material of the molded article was an acrylic resin, and it was molded into a tray-shaped article having a longitudinal length of 95 mm, a transverse length of 65 mm, a rising edge height of 4.5 mm and R at the corner part of 2.5 mm. Irradiation conditions included 120 W/cm, six lamps, a lamp height of 10 cm and a belt speed of 15 m/min.

Example 5

An acrylic resin film having a thickness of 125 μm was used as a substrate sheet. A picture layer composed of an acryl-based ink and an adhesion layer composed of an acrylic resin were formed by printing on the one surface of the substrate sheet in order according to the gravure printing method. A protecting layer obtained by blending 200 parts (solid component: 100 parts) of the varnish A obtained in Example 1 and 10 parts of 1,6-hexane diisocyanate trimer (trade name: Coronate HX, manufactured by Nippon Polyurethane Industry K.K.), and 5 parts of a photopolymerization initiator (trade name: Irgacure 184, manufactured by Ciba-Geigy Co., Ltd.), were formed by printing on the opposite surface of the substrate sheet according to the lip coating method. The thickness of the protecting layer was 5 μm. The protecting layer was semi-cured by heating at 80° C. for 30 seconds to obtain a surface protecting material.

This surface protecting material was adhered to the surface of a molded article by utilizing the insert molding method according to the same manner as in Example 4, then it was irradiated with ultraviolet ray. Irradiation conditions included 120 W/cm, two lamps, a lamp height of 10 cm and a belt speed of 2.5 m/min.

Example 6

A molded article was produced in the same manner as in Example 4 except that the varnish B obtained in Example 3 was used instead of the varnish A of Example 4.

Comparative Example C1

A protecting layer composed of a silicon-based resin (TPR 6701® manufactured by Toshiba silicone K.K.) was formed into a layer by the gravure printing method on the same acrylic resin film as used in Example 4. Then, this resin composition was completely cured by heating. A molded article was produced in the same manner as in Example 4 except that the resulting surface protecting material was used and ultraviolet irradiation was not conducted after molding.

Comparative Example C2

A protecting layer composed of an urethane acrylate having a polymerizable double bond, a reactive diluting agent and a photopolymerization initiator was formed into a layer by the gravure printing method on the same acrylic film as used in Example 4. Then, this resin composition was completely cured by irradiation with ultraviolet ray. A molded article was produced in the same manner as in Example 4 except that the resulting surface protecting material was used and ultraviolet irradiation was not conducted after molding. Irradiation conditions in preparing the transfer material included 120 W/cm, two lamps, a lamp height of 5 cm, and belt speed of 20 m/min.

Comparative Example C3

A protecting layer composed of an urethane acrylate having a polymerizable double bond a thermoplastic acrylic resin, and a photopolymerization initiator was formed into a layer by the gravure printing method on the same acrylic resin film as used in Example 4. Then, this active energy ray curable resin composition was semi-cured by the first irradiation with ultraviolet ray.

A molded article was produced in the same manner as in Example 4 except that the resulting surface protecting material was used. Irradiation conditions in preparing the transfer material included 120 W/cm, one lamp, a lamp height of 10 cm, and belt speed of 50 m/min.

Comparative Example D

A molded article was produced in the same manner as in Example 4 except that the varnish C obtained in Comparative Example B was used instead of the varnish A of Example.

Performance Test

Crack occurrence, chemical resistance ability and abrasion resistance ability were evaluated with respect to the above-mentioned Examples 4 to 6, Comparative Examples C1 to C3, and Comparative Example D (Table 2). The evaluation standards were the same as those of Example 1.

TABLE 2

|  | Crack | Chemical resistance | Abrasion resistance 100 g | Abrasion resistance 300 g |
|---|---|---|---|---|
| Example 4 | ○ | ⊚ | ⊚ | ○ |
| Example 5 | ○ | ⊚ | ⊚ | ○ |
| Example 6 | ○ | ⊚ | ⊚ | ⊚ |
| Comparative Example C1 | Δ | Δ | Δ | x |
| Comparative Example C2 | x | ○ | ○ | ○ |
| Comparative Example C3 | ○ | Δ | Δ | x |
| Comparative Example D | ○ | ○ | x | x |

From the evaluation results of Table 2, the followings are evident. That is, the molded articles of Examples 4 to 6 having as the most outer layer a protecting layer composed of a heat reactant of the heat and active energy ray curable resin composition comprising as an active ingredient a polyfunctional isocyanate and a polymer having an acryl equivalent weight from 100 to 300 g/eq, a hydroxyl value from 20 to 500 and a weight-average molecular weight from 5000 to 50000 are excellent in abrasion resistance and chemical resistance, and have no cracks in the curved part of the molded article. However, the molded article of Comparative Example C1 has no sufficient result in any of crack occurrence, abrasion resistance and chemical resistance. The molded article of Comparative Example C2 has a lot of cracks while it is excellent in abrasion resistance and chemical resistance. The molded article of Comparative Example C3 is inferior in abrasion resistance and chemical resistance while it has no cracks. Further, the molded article of Comparative Example D having a protecting layer composed of a heat reactant of the conventional heat and active energy ray curable resin composition is also inferior in abrasion resistance since the acryl equivalent weight of the polymer contained in the heat and active energy ray curable resin composition is over the specific range.

Example 7

A polyester resin film having a thickness of 38 μm was used as a substrate sheet. A melamine resin-based releasing agent was applied on the substrate sheet in a thickness of 1 μm by using the gravure printing method to form a releasing layer, and a protecting layer composed of 200 parts (solid content: 100 parts) of the varnish B obtained in Example 3, and 10 parts of 1,6-hexane diisocyanate trimer (trade name: Coronate HX, manufactured by Nippon Polyurethane Industry K.K.), and 5 parts of a photopolymerization initiator (trade name: Irgacure 184, manufactured by Ciba-Geigy Co., Ltd.), 8 parts of the following UV absorber A, and 2 parts of a photostabilizer was formed thereon by using the lip coating method. The thickness of the protecting layer was 5 μm. The protecting layer was semi-cured by heating at 150° C. for 20 seconds, and an anchor layer composed of an urethane-based ink, a picture layer composed of an acryl-based ink and an adhesion layer composed of an acrylic resin were formed in order by printing according to the gravure printing method to obtain a transfer material.

UV Absorber A

Hydroxyphenylbenzotriazol represented by the formula:

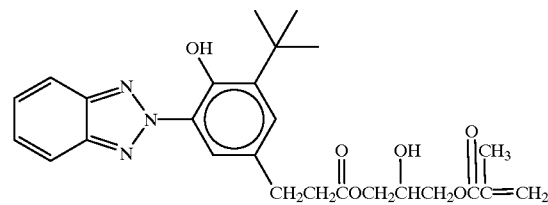

This transfer material was transferred to the surface of a molded article by utilizing the simultaneous transferring and molding method, then, the substrate sheet was peeled, and ultraviolet ray was irradiated to completely cure the protecting layer. The molding conditions included a resin temperature of 240° C., a mold temperature of 55° C., and a resin pressure of about 300 kg/cm². The raw material of the molded article was an acrylic resin, and it was molded into a tray-shaped article having a longitudinal length of 95 mm, a transverse length of 65 mm, a rising edge height of 4.5 mm and R at the corner part of 2.5 mm. Irradiation conditions included 120 W/cm, two lamps, a lamp height of 10 cm and a belt speed of 2.5 m/min.

Example 8

A molded article was produced in the same manner as in Example 7, except that the following UV absorber B was used instead of the UV absorber A of Example 7.

UV Absorber B

Hydroxyphenyl-S-triazine represented by the formula:

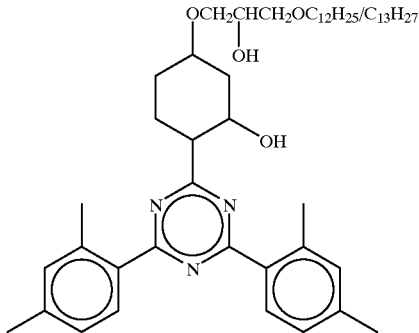

Comparative Example E1

A molded article was produced in the same manner as in Example 7, except that the UV absorber C: 2-(2'-Hydroxy-5'-methacryloxyethylphenyl)-2H-benzotriazole was used instead of the UV absorber A of Example 7.

Comparative Example E2

A molded article was produced in the same manner as in Example 7, except that the UV absorber D: Ethandiamide-N-(2-ethoxyphenyl)-N'-(4-isododecylphenyl)-(oxalicanilide) was used instead of the UV absorber A of Example 7.

Comparative Example E3

A molded article was produced in the same manner as in Example 7, except that the UV absorber E: 2,2',4,4'-Tetrahydroxybenzophenone was used instead of the UV absorber A of Example 7.

Comparative Example F

A molded article was produced in the same manner as in Example 7, except that no UV absorber was used.
Performance Test Yellow resistance (light resistance, or weather resistance), abrasion resistance, and transparency were evaluated with respect to the above-mentioned Examples 7 and 8, Comparative Examples E1 to E3, and Comparative Example F (Table 3).

The yellow resistance was evaluated by the colour difference ΔE as defined by the formula:

$$\Delta E = \sqrt{(\Delta L^2 + \Delta a^2 + \Delta b^2)}$$

The values of ΔL, Δa, and Δb are determined by measuring the values L, a, and b of the protecting layer before and after the light resistance test, by using the spectroscopic colour difference meter "SZ-Σ80" manufactured by Nippon Denshoku Kogyo K.K.

Condition of Light Resistance Test

Apparatus: I Super UV Tester (Iwasaki Denki K.K.)

UV intensity: 100 mw/cm$^2$

Temperature: 75° C.

Period: 80 hours

Abrasion resistance was evaluated by applying a load (300 g) to a #000 steel wool of 1 cm square, observing the degree to be injured of the surface after 200 times reciprocating movements at the condition of 2 reciprocation/second and a moving distance of 2 cm, according to the following evaluation standards judged by naked eyes: ○ good, Δ relatively bad, × bad.

Transparency was evaluated by observing the protecting layers which contains the UV absorber in equal amounts, according to the following evaluation standards judged by naked eyes: ○ transparent, Δ rather translucent, × much translucent.

TABLE 3

|  | Yellow resistance | Abrasion resistance | Transparency |
| --- | --- | --- | --- |
| Example 7 | 20 | ○ | ○ |
| Example 8 | 20 | ○ | ○ |
| Comparative Example E1 | 39 | Δ | × |
| Comparative Example E2 | 43 | Δ | Δ |
| Comparative Example E3 | 36 | × | Δ |
| Comparative Example F | 45 | ○ | — |

From the evaluation results of Table 3, the followings are evident. That is, Example 7 in which the protecting layer contains UV absorber A, and Example 8 in which the protecting layer contains UV absorber B are excellent in all of the yellow resistance, abrasion resistance, and transparency. However, Comparative Examples E1 to E3 are poor in all of the yellow resistance, abrasion resistance, and transparency. Comparative Example F is excellent in abrasion resistance, but poor in yellow resistance.

Example 9

An acrylic resin film having a thickness of 125 μm was used as a substrate sheet. A picture layer composed of an acryl-based ink, and an adhesion layer composed of an acrylic resin were formed by printing on the one surface of the substrate sheet in order according to the gravure printing method. A protecting layer obtained by blending 200 parts (solid component: 100 parts) of the varnish B obtained in Example 3, 10 parts of 1,6-hexane diisocyanate trimer (trade name: Coronate HX, manufactured by Nippon Polyurethane Industry K.K.), and 5 parts of a photopolymerization initiator (trade name: Irgacure 184, manufactured by Ciba-Geigy Co., Ltd.), 8 parts of the UV absorber A as in Example 7, 2 parts of a photostabilizer was formed by printing on the opposite surface of the substrate sheet according to the lip coating method. The thickness of the protecting layer was 5 μm. The protecting layer was semi-cured by heating at 80° C. for 30 seconds to obtain a surface protecting material.

This surface protecting material was adhered to the surface of a molded article by utilizing the insert molding method, then the protecting layer was irradiated with ultraviolet ray to completely cure. The molding conditions included a resin temperature of 220° C., a mold temperature of 55° C., and a resin pressure of about 300 kg/cm$^2$. The raw material of the molded article was an acrylic resin, and it was molded into a tray-shaped article having a longitudinal length of 95 mm, a transverse length of 65 mm, a rising edge height of 4.5 mm and R at the corner part of 2.5 mm. Irradiation conditions included 120 W/cm, two lamps, a lamp height of 10 cm, and a belt speed of 2.5 m/min.

Example 10

A molded article was produced in the same manner as in Example 9, except that the UV absorber B of Example 8 was used instead of the UV absorber A of Example 9.

Comparative Example G1

A molded article was produced in the same manner as in Example 9, except that the UV absorber C of Comparative Example E1 was used instead of the UV absorber A of Example 9.

Comparative Example G2

A molded article was produced in the same manner as in Example 9, except that the UV absorber D of Comparative Example E2 was used instead of the UV absorber A of Example 9.

Comparative Example G3

A molded article was produced in the same manner as in Example 9, except that the UV absorber E of Comparative Example E3 was used instead of the UV absorber A of Example 9.

Comparative Example H

A molded article was produced in the same manner as in Example 9, except that no UV absorber was used.

Performance Test

Yellow resistance, abrasion resistance, and transparency were evaluated with respect to the above-mentioned Examples 9 and 10, Comparative Examples G1 to G3, and Comparative Example H (Table 4). The evaluation standards were the same as those of Example 7.

TABLE 4

|  | Yellow resistance | Abrasion resistance | Transparency |
|---|---|---|---|
| Example 9 | 20 | ⊚ | ○ |
| Example 10 | 20 | ⊚ | ○ |
| Comparative Example G1 | 39 | Δ | x |
| Comparative Example G2 | 43 | Δ | Δ |
| Comparative Example G3 | 36 | x | Δ |
| Comparative Example H | 45 | ⊚ | — |

From the evaluation results of Table 4, the followings are evident. That is, Example 9 in which the protecting layer contains UV absorber A, and Example 10 in which the protecting layer contains UV absorber B are excellent in all of the yellow resistance, abrasion resistance, and transparency. However, Comparative Examples G1 to G3 are poor in all of the yellow resistance, abrasion resistance, and transparency. Comparative Example H is excellent in abrasion resistance, but poor in yellow resistance.

TECHNICAL EFFECTS OF THE INVENTION

The sheet material of the present invention has a protecting layer which is composed of a heat reactant of a heat and active energy ray curable resin composition comprising as an active ingredient a polyfunctional isocyanate and a polymer having a (meth)acryl equivalent weight from 100 to 300 g/eq, a hydroxyl value from 20 to 500 and a weight-average molecular weight from 5000 to 50000. And, this protecting layer transferred to the surface of a molded article is cured by active energy ray irradiation. Therefore, a molded article excellent in abrasion resistance and chemical resistance can be obtained, and cracking is not caused in the curved part of the molded article. Further, since the protecting layer is cured in part by heat in transfer material production, a large scale active energy ray irradiation apparatus is not required in active energy ray irradiation to realize low cost.

What is claimed is:

1. A transfer material comprising a substrate sheet having releasing property and a protecting layer formed on the substrate sheet, wherein the protecting layer is composed of a heat reactant of a heat and active energy ray curable resin composition which comprises as an active ingredient a polyfunctional isocyanate and a polymer having a (meth)acryl equivalent weight from 100 to 300 g/eq, a hydroxyl value from 20 to 500 and a weight-average molecular weight from 5000 to 50000.

2. The transfer material according to claim 1, wherein the polymer is a reaction product obtained by an addition reaction of a glycidyl (meth)acrylate-based polymer and α,β-unsaturated monocarboxylic acid.

3. The transfer material according to claim 2, wherein the glycidyl (meth)acrylate-based polymer is a homopolymer of glycidyl (meth)acrylate, or a copolymer of glycidyl (meth)acrylate and an α,β-unsaturated monomer having no carboxyl group.

4. The transfer material according to claim 1 further comprising an ultraviolet absorber which has an aliphatic group having 3 to 30 carbon atoms, and the aliphatic group comprising a 2-hydroxypropylene dioxy moiety.

5. The transfer material according to claim 4, wherein the ultraviolet absorber has a structure represented by the formula:

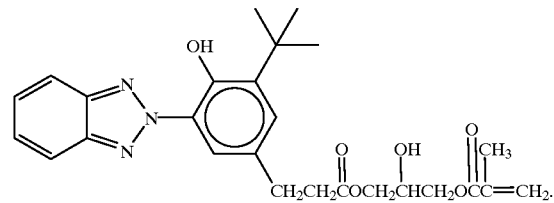

6. The transfer material according to claim 4, wherein the ultraviolet absorber has a structure represented by the formula:

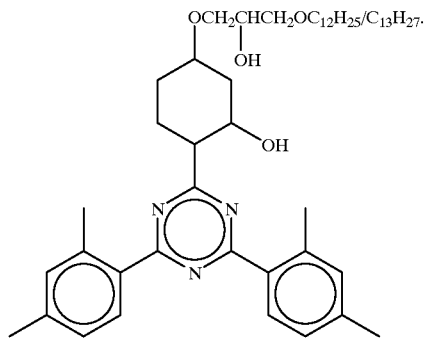

7. The transfer material according to claim 1 further comprising an adhesion layer formed on the protecting layer.

8. The transfer material according to claim 1 further comprising a picture layer and an adhesion layer formed in order on the protecting layer.

9. A method for producing a molded article excellent in abrasion resistance and chemical resistance comprising:
   adhering a protecting layer of a transfer material which comprises a substrate sheet having releasing property and a protecting layer formed on the substrate sheet, on the surface of a molded article;
   releasing said substrate sheet; and
   irradiating the protecting layer transferred to said molded article with an active energy ray,
   wherein said transfer material is one according to claim 1.

10. A method for producing a molded article excellent in abrasion resistance and chemical resistance comprising:
    placing in a mold a transfer material comprising a substrate sheet having releasing property and a protecting layer formed on the substrate sheet with the protecting layer thereof facing inside;
    injecting a resin into a cavity for filling, molding and simultaneously adhering the protecting layer of the transfer material to the surface of the molded resin; and
    irradiating the protecting layer transferred to the resulting molded article with an active energy ray,
    wherein said transfer material is one according to claim 1.

11. A method for producing a molded article excellent in abrasion resistance and chemical resistance comprising the steps of:
    adhering the substrate sheet of the surface protecting material which comprises a substrate sheet having no releasing property and a protecting layer formed on the substrate sheet, on the surface of a molded article; and irradiating the protecting layer of the surface protecting material adhered to the resulting molded article with an active energy ray, wherein said protecting layer comprises a heat reactant of a heat and active energy ray curable resin composition comprising as an active ingredient a polyfunctional isocyanate and a polymer having a (meth)acryl equivalent weight from 100 to 300 g/eq, a hydroxyl value from 20 to 500 and a weight-average molecular weight from 5000 to 50000.

12. A method for producing a molded article excellent in abrasion resistance and chemical resistance comprising the steps of:

placing in a mold the surface protecting material comprising a substrate sheet having no releasing property and a protecting layer formed on the substrate sheet with the substrate sheet facing inside;

injecting a resin into cavity for filling, molding and simultaneously adhering the substrate sheet of the surface protecting material to the surface thereof; and irradiating the protecting layer of the surface protecting material adhered to the resulting molded article with an active energy ray, wherein said protecting layer comprises a heat reactant of a heat and active energy ray curable resin composition comprising as an active ingredient a polyfunctional isocyanate and a polymer having a (meth)acryl equivalent weight from 100 to 300 g/eq, a hydroxyl value from 20 to 500 and a weight-average molecular weight from 5000 to 50000.

13. The method according to claim 11 or 12, wherein the polymer is a reaction product obtained by an addition reaction of a glycidyl (meth)acrylate-based polymer and α,β-unsaturated monocarboxylic acid.

14. The method according to claim 13, wherein the glycidyl (meth)acrylate-based polymer is a homopolymer of glycidyl (meth)acrylate, or a copolymer of glycidyl (meth) acrylate and an α,β-unsaturated monomer having no carboxyl group.

15. The method according to claim 11 or 12, wherein the heat and active energy ray curable resin composition which forms the protecting layer, further comprising an ultraviolet absorber which has an aliphatic group having 3 to 30 carbon atoms, and comprising a 2-hydroxypropylene dioxy moiety.

16. The method according to claim 15, wherein the ultraviolet absorber has a structure represented by the formula:

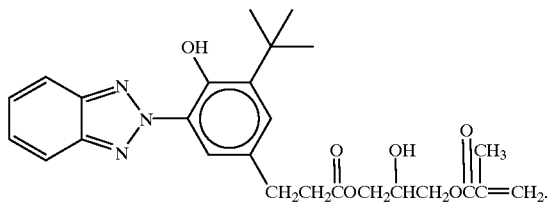

17. The method according to claim 15, wherein the ultraviolet absorber has a structure represented by the formula:

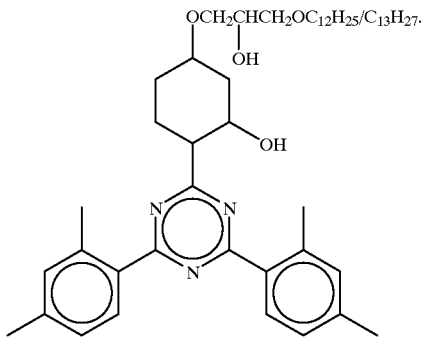

18. The method according to claim 11 or 12, wherein the surface protecting material further comprises an adhesive layer on the surface on which the protecting layer is not formed, of the substrate sheet.

19. The method according to claim 18, wherein the surface protecting material further comprises a picture layer, and an adhesive layer on the surface on which the protecting layer is not formed, of the substrate sheet.

20. A surface protecting material comprising a substrate sheet having no releasing property and a protecting layer formed on the substrate sheet, wherein the protecting layer is composed of a heat reactant of the heat and active energy ray curable resin composition which comprises as an active ingredient a polyfunctional isocyanate, a polymer having a (meth)acryl equivalent weight from 100 to 300 g/eq, a hydroxyl value from 20 to 500 and a weight-average molecular weight from 5000 to 50000, and an ultraviolet absorber which has an aliphatic group having 3 to 30 carbon atoms, and the aliphatic group comprising a 2-hydroxypropylene dioxy moiety.

21. The surface protecting material according to claim 20, wherein the ultraviolet absorber has a structure represented by the formula:

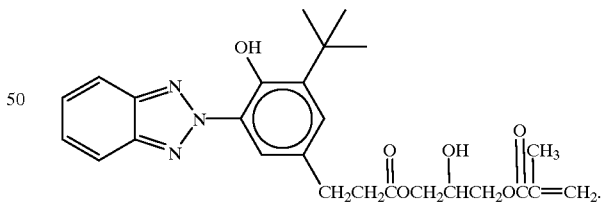

22. The surface protecting material according to claim 20, wherein the ultraviolet absorber has a structure represented by the formula:

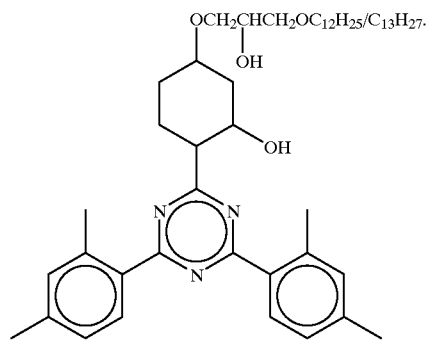

23. The surface protecting material according to claim 20, further comprising an adhesive layer on the surface on which the protecting layer is not formed, of the substrate sheet.

24. The surface protecting material according to claim 20, further comprising a picture layer, and an adhesive layer on the surface on which the protecting layer is not formed, of the substrate sheet.

* * * * *